May 27, 1958  R. W. STREHLOW ET AL  2,836,369
FOOD WASTE GRINDER

Filed March 23, 1954  3 Sheets-Sheet 1

FIG.1.

ROBERT W. STREHLOW
GILBERT W. QUAST
*INVENTORS*

BY *W. D. O'Connor*
ATTORNEY

May 27, 1958  R. W. STREHLOW ET AL  2,836,369
FOOD WASTE GRINDER

Filed March 23, 1954  3 Sheets-Sheet 2

ROBERT W. STREHLOW
GILBERT W. QUAST
INVENTORS

BY W. D. O'Connor
ATTORNEY

May 27, 1958

R. W. STREHLOW ET AL 2,836,369

FOOD WASTE GRINDER

Filed March 23, 1954

ROBERT W. STREHLOW
GILBERT W. QUAST
INVENTORS

BY W. J. O'Connor

ATTORNEY

United States Patent Office 2,836,369
Patented May 27, 1958

2,836,369

FOOD WASTE GRINDER

Robert W. Strehlow, New Berlin, and Gilbert W. Quast, Milwaukee, Wis., assignors to Chain Belt Company, Milwaukee, Wis., a corporation of Wisconsin Application March 23, 1954, Serial No. 418,014

17 Claims. (Cl. 241—46)

This invention relates generally to comminuting and disintegrating apparatus and more particularly to an improved comminutor and disintegrator for grinding and disposing of food wastes and like material.

It is a general object of the present invention to provide an improved disintegrator or grinder for food waste and like material that is capable of efficient and economical operation in grinding waste substances ordinarily encountered for disposal.

Another object of the invention is to provide an improved grinder that operates efficiently and at the required rate in reducing waste materials to particles of proper size and condition for satisfactory disposal through the usual drain connections.

Another object is to provide an improved food waste grinder that operates with a minimum of vibration and that is free from the likelihood of jamming and stalling.

Another object is to provide a centrifugal grinder in which the rotor is of bowl shape and rotates about a vertical axis to whirl material and urge it outwardly and upwardly into rotary grinding engagement with stationary disintegrating teeth.

Another object is to provide a centrifugal grinder in which different items of the material being ground are subjected to the action of different groups of successively arranged disintegrating teeth.

Another object is to provide a centrifugal grinder in which the clearance space between the rotating member and the stationary member is in the form of a labyrinth seal arranged to prevent the escape of material until it is ground to the desired size.

Still another object is to provide an improved grinder for food waste and like material so arranged that when the rotor bowl slows down or stops rotating material in the bowl falls free from the disintegrating teeth thereby clearing the grinder to prevent jamming and to facilitate restarting.

The improved grinder for food waste or like materials to which the present invention is directed is of the centrifugal type having a motor driven rotor turning about a vertical axis in the lower end of a generally cylindrical housing forming a grinding chamber with a superimposed feed stack. According to the invention, the rotor of the grinder is provided with an upturned rim forming a novel bowl-shaped impeller for whirling the material fed into it through the feed stack. The material whirling with the impeller is urged by centrifugal force outwardly to the upturned bowl rim and upwardly along its inner surface into rotary grinding engagement with stationary disintegrating teeth carried by the housing. The inside of the bowl shaped runner is provided with driving lugs or vanes that engage and whirl the material and operate somewhat as mulling and cutting elements as well as constituting pumping vanes for ejecting water introduced to flush away the ground material. Radially disposed discharge slots are provided in a cutting ring mounted in the housing just above the edge of the rotating bowl with the inner ends of the slots spaced slightly outwardly from the inner edge of the bowl rim whereby large particles of material being ground tend to move upward past the entrances to the slots while small ground particles and the flushing water are discharged by centrifugal force outward through the slots over the edge of the bowl, the slots being of appropriate size to prevent the discharge of material until it has been ground to the required degree of fineness. The stationary cutting teeth are formed on the interior of the cutting ring to engage and disintegrate the material whirling with the bowl in the grinding chamber. The outer edge of the bowl is provided with a raised lip which partially obstructs the outer ends of the discharge slots and that carries upwardly projecting secondary cutting teeth which overlap the discharge slots and operate to shear elongated material extruded from them, the overlapping arrangement providing a labyrinth seal to prevent the discharge of uncut material. The secondary teeth may be made removable in order that they may be repositioned or replaced in the event of excessive wear. A further set of stationary cutting teeth is provided in the housing outwardly of the secondary teeth to clip off material clinging to the outside of the bowl. As an alternative, the positions of the slots and teeth may be reversed with the discharge slots formed in the upper edge of the bowl and the secondary teeth depending from the housing in overlapping relationship with the bowl edge. The improved grinder is self-clearing for restarting with low starting torque in that when the bowl slows down the material remaining in it falls away from the cutting teeth into the bottom of the bowl.

The foregoing and other objects of this invention will become more fully apparent as the following detailed description of an improved rotary grinder constituting an exemplary embodiment thereof is read in conjunction with the accompanying illustrative drawings, wherein.

Figure 1:
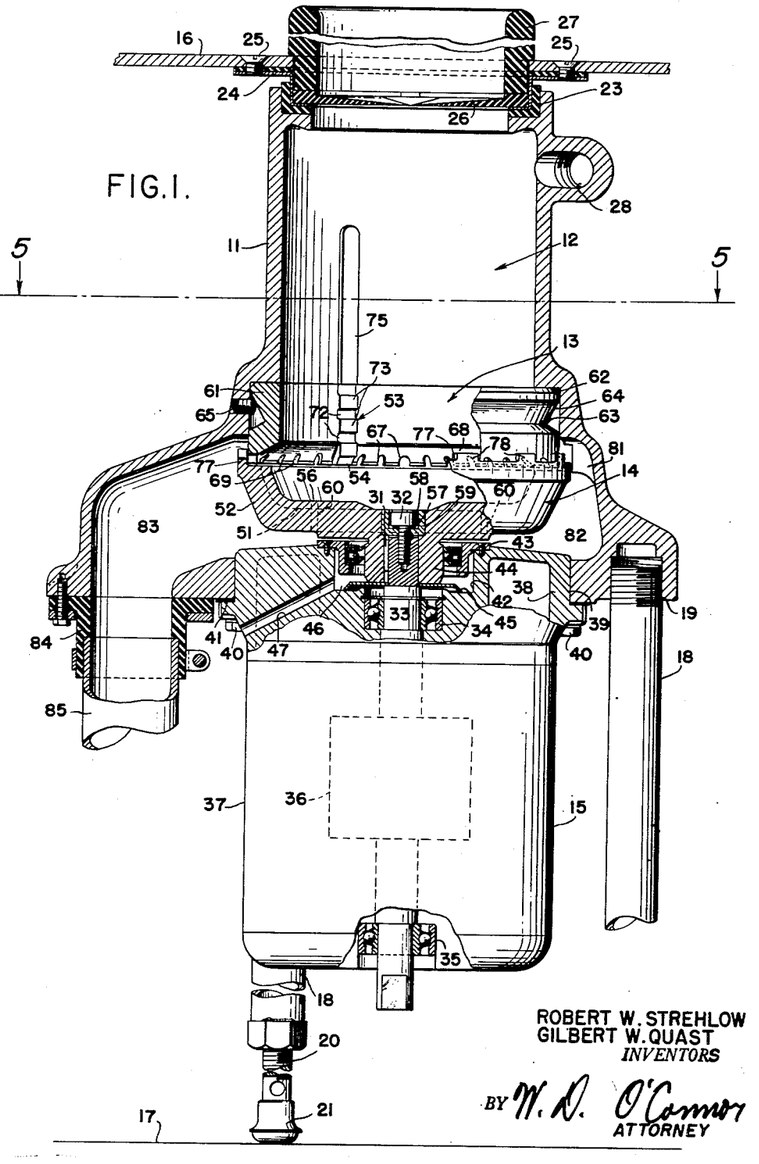
Figure 1 is a view largely in vertical longitudinal section through an improved centrifugal grinder embodying the present invention, the section being taken substantially along the plane represented by the line 1—1 of Fig. 5.

Referring more specifically to the drawings and particularly to Fig. 1 thereof, the improved food waste comminutor or disintegrator there shown by way of example is of the vertical axis centrifugal grinder type, the particular machine illustrated being of the size and capacity especially adapted for the disposal of food waste material, occurring in restaurants, hospital kitchens and establishments of like nature. The grinder structure show as exemplifying a practical embodiment of the present invention comprises essentially a generally cylindrical vertically disposed housing 11 the upper portion of which constitutes an inlet hopper or feed stack 12 terminating at its lower end in a grinding chamber 13. The moving element of the grinder is in the form of a bowl shaped rotor 14 that is mounted for rotation about a vertical axis and is arranged within the lower part of the housing 11 concentric with and constituting the bottom of the grinding chamber 13. As shown, the rotor 14 is connected to be driven by an electric motor 15 that is secured to and constitutes a closure for the bottom of the housing 11.

Figure 5:
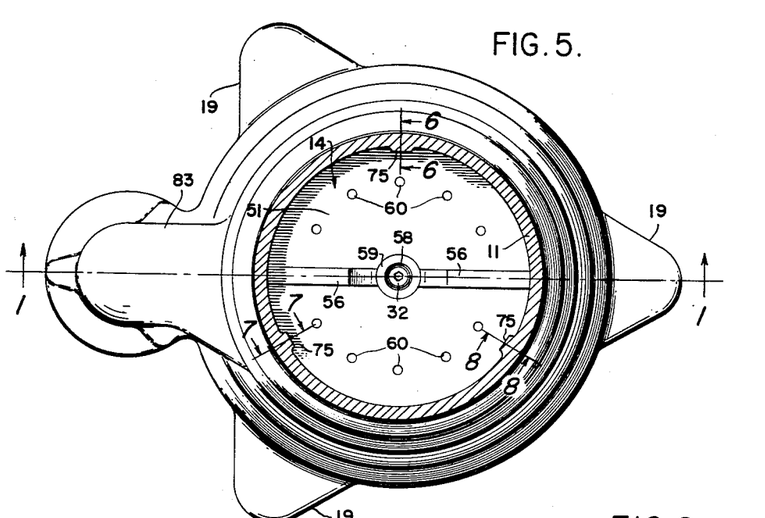
Fig. 5 is a view in horizontal section through the grinder, taken on the plane represented by the line 5—5 in Fig. 1.

As indicated in Fig. 1, the grinder structure is mounted beneath a sink or drain board 16, only a portion of which is shown, but its weight is supported entirely from the floor 17 by means of three equally spaced legs 18. As shown, each leg 18 may be in the form of a tube or pipe that is threaded at its upper end, the three legs being screwed into complementary sockets 19 formed integrally in angularly spaced relationship on the lower end of the housing 11, as shown in Fig. 5. Each of the legs 18 has threaded into its lower end an adjusting stud 20 provided with a rubber foot 21 for engaging the floor 17 as shown in Fig. 1, the arrangement being such that the vertical position of the grinder may be adjusted by turning the adjusting studs 20 in the ends of the legs 18, the rubber feet serving to minimize the transmission of vibration from the grinder to the floor 17.

At the upper end of the feed stack 12 the housing 11 is counterbored to receive a resilient gasket 23 of L shape in cross section and formed of rubber or the like that serves to minimize the transmission of vibration from the grinder to the drain board 16. A watertight connection is made with the drain board 16 by means of a metallic flange or collar element 24 that is secured by screws 25 to the lower surface of the drain board 16 in register with the drain opening therein, the arrangement being such that the depending cylindrical part of the collar 24 is received within the resilient gasket 23 in the top of the housing 11. Installation of the grinder beneath the sink or drain board is effected with a minimum of difficulty since it is merely necessary to secure the collar 24 in position beneath the drain board opening and then move the grinder under it with the gasket 23 in alignment with the collar. The adjusting studs 20 at the ends of the legs 18 may then be turned to lift the entire grinder structure for engaging the gasket with the collar with sufficient pressure to form a watertight seal. By this arrangement the entire weight of the grinder is carried by the floor 17 without imposing any load on the drain board 16. Furthermore, the angular position of the grinder relative to plumbing connections and the like may be adjusted readily during installation by turning the housing 11 bodily relative to the collar 24.

The material to be ground may be introduced into the feed stack 12 from the drain board 16 through any suitable entrance arrangements preferably adapted to prevent splashing of material from the grinding chamber 13 upward out of the feed stack. The particular entrance arrangement shown in Fig. 1 includes a partition or baffle 26 in the form of a feather ring or diaphram disc that fits within the collar 24 and is provided with radial slits forming between them deflectable fingers adapted to bend for permitting the entrance of the material into the feed stack 12. Above the baffle or shield 26 the collar 24 receives the lower end of a cylindrical rapping block 27 of resilient material that projects above the surface of the drain board 16 to serve as a receiver for food waste material. The block 27 fits loosely within the collar 24 to permit drainage of water from the surface of the drain board 16 down between the outside of the block and the inside of the collar into the grinder.

The minimum internal diameter of the waste receiving opening through the rapping block 27 and the feed stack 12 has in this instance been selected as approximately five inches which is sufficiently large to receive a quart size paper milk carton without crushing and to permit it to rotate with the rotor 14. Likewise the length of the feed stack 12 is sufficient to accommodate the quart size milk carton, it having been found that a feed stack of this size is sufficiently large to permit turning and tumbling of practically all other objects of waste material that are ordinarily encountered. To provide water for assisting in the grinding operation and to flush away the ground material into the drain connection, the upper part of the feed stack 12 has formed in it a tangentially directed water inlet opening 28 that is adapted for connection to a suitable source of water under pressure.

As best shown in Fig. 1, the bowl-shaped rotor 14 that constitutes the moving element of the grinder is secured by a key 31 and a screw 32 to the upper end of a vertically disposed driving shaft 33 of the driving motor 15. The motor shaft 33 is rotatably mounted in vertically spaced bearings 34 and 35 at the upper and lower ends of the motor 15 respectively, a rotor element 36 of the motor being fixed on the shaft between the bearings. A cooperating stator or frame element 37 of the motor encloses the rotor 36 and is provided at its upper end with a special end-bell or flange plate 38 that constitutes a closure element for the bottom of the housing 11. As shown, the closure element or flange 38 fits in a circular opening 39 in the bottom of the housing 11 that is of sufficient diameter to admit the bowl shaped rotor 14. When assembling the grinder, the motor 15 with the rotor 14 attached, is positioned by introducing the rotor through the opening 39 and then fitting the end bell 38 into the opening and securing it by capscrews 40 with adjusting shims 41 interposed between a shoulder on the flange or end bell 38 and the bottom of the housing 11.

The upper face of the end bell 38 is provided with a central recess 42 that receives a shaft seal 43 one element of which is fitted on a hub element 44 of the rotor 14 with the other element secured to the end bell, the seal operating to prevent the flow of liquid down into the bearing 34. Furthermore, between the seal 43 and the bearing 34, the shaft 33 is fitted with a shield or slinger disc 45 which operates to intercept any drops of liquid that may leak through the seal 43 and to divert them outwardly into an annular drain trough 46 from which the liquid drains away through a passageway 47 leading to the exterior of the grinder. The driving motor 15 is of suitable speed and power to operate the grinder rotor 14 in a manner to meet the requirements of the particular grinding operation undertaken, the motor of the grinder illustrated herein being capable of operating at a speed of about 1725 revolutions per minute.

Figure 2:
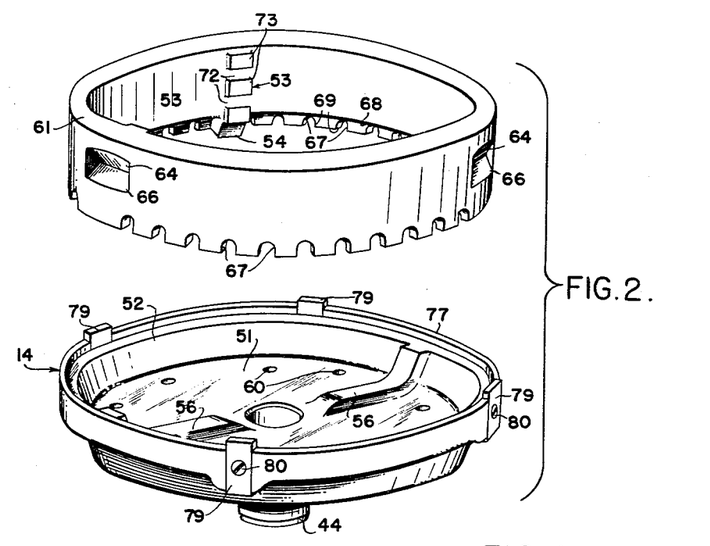
Fig. 2 is an exploded perspective view of a rotary grinding bowl and a cooperating stationary cutting ring generally similar to the bowl and ring incorporated in the grinder of Fig. 1.

The rotor 14 that is rotated by the motor 15 is of a novel shape that renders it capable of effecting the grinding operation in a new and improved manner. As shown in Figs. 1, 2 and 5, the rotor presents a substantially flat disc-like central portion 51 extending outwardly from the hub 44 for receiving material dropped onto it through the feed stack 12. The flat disc-like portion 51 of the rotor 14 is substantially equal in diameter to the internal diameter of the feed stack 12 and it blends at its outer edge into a sloping upturned rim 52 to form an impeller of generally bowl shape. By this arrangement material falling on the center portion 51 is caused to whirl with the rotating impeller in the grinding chamber 13 and is urged by centrifugal force outwardly toward and against the bowl rim 52 whereupon it moves upwardly along the sloping inner wall of the rim. The material is compacted by centrifugal force into the general form of an annulus having frictional driving engagement with the inner surface of the bowl rim. As the compacted annulus of material rotates in frictional engagement with the upper edge of the bowl rim 52 it comes into rotary grinding engagement with stationary disintegrating teeth 53 on the inside of the housing 11 that present lower cutting edges 54 disposed in cooperating relationship with the upper edge of the bowl rim. One distinct advantage of this grinding arrangement resides in the fact that the apparatus is self-clearing when the rotor slows down or stops. Consequently, any tendency for the grinder to jam is largely self-correcting since when the speed of rotation is reduced the material that had been compacted and forced into disintegrating engagement with the cutting edges 54 under centrifugal force tends to fall away from the cutting teeth thereby clearing the jam and permitting the rotor to resume its normal speed. Likewise when the grinding operation is terminated and the rotor stops turning, any of the material remaining in the grinding chamber falls free from the teeth into the bottom of the bowl thereby freeing the rotor for restarting without subjecting the motor to the necessity of exerting excessive starting torque.

As appears in the drawing, the inner wall of the bowl rim 52 is inclined upward at a steep angle which approaches the vertical position as nearly as feasible without being so steep as to cause the material whirling with the bowl to stick or adhere to the rim under the action of centrifugal force. It has been found that by inclining the surface of the bowl rim 52 upward at an angle of about 70 degrees to the horizontal central portion 51, the material being ground will move freely up the inner wall of the bowl rim under the propelling action of centrifugal force without clinging to the surface, while coincidentally advantage is taken of the maximum component of centrifugal force to retain the material compacted against the inner wall of the rim with sufficient frictional action to insure rotation with the rim.

For imparting the rotary or whirling motion to the material as it is dropped into the rotating bowl 14, the inner surface of the bowl is provided with a pair of diametrically disposed driving vanes or ribs 56. As best shown in Fig. 2 the ribs 56 project in opposite directions from points an inch or so outwardly from the center of the bowl hub 44 and extend radially to the rim 52 and then upwardly along the inner surface of the rim to its upper edge. The center portion of the bowl is thus left free of projections to permit large objects fed into the grinder to drop down onto the flat center portion 51 in order that they may enter the grinding chamber as far as possible. When this occurs, the inner portions of the vanes 56 operate to some extent as grinding teeth rotating in contact with the lower ends of the long objects as well as causing the objects to be whirled and tumbled within the grinding chamber 13 in grinding engagement with the inner ends of the stationary teeth 53 therein. The upper ends of the vanes 56 at the top of the bowl rim also serve as grinding teeth in cooperation with the lower cutting edges 54 of the stationary cutting teeth 53 at the bottom of the grinding chamber 13. In addition to operating as grinding teeth and to whirl the material with the bowl, the ribs 56 also serve as pumping vanes that operate to eject the flushing water which descends through the feed stack 12 from the water inlet opening 28. In the bowl shown as part of the particular grinder set forth herein two vanes 56 about one-half inch wide and one-fourth inch high have been found to operate satisfactorily but it is to be understood that the size and number of the vanes may be varied to meet the particular circumstances encountered.

Leakage of water through the center of the bowl 14 into the connection between the hub 44 and the upper end of the shaft 33 is prevented by means of an annular washer 57 including a ring of rubber or the like which encircles the retaining screw 32 and is compressed between the head of the screw and the bottom of a screw receiving opening 58 in a bushing 59 of brass or the like that is pressed into the top of the bore of the bowl hub 44. When the grinder is not in operation any water which may accumulate in the bottom of the bowl 14 is drained away through a series of drain holes 60 extending vertically through the disc portion 51 of the bowl, the holes being each about one-fourth inch in diameter and arranged in a circle spaced inwardly from the rim 52 as best shown in Fig. 5. The drain holes 60 serve to maintain the inside of the bowl 14 dry when not in use thereby reducing the deleterious effects of corrosion and contamination. The diameter and depth of the rotor bowl 14 are chosen to best accommodate and operate upon the particular type and quantity of material to be ground in the grinder. In the particular apparatus illustrated the internal diameter of the rotor bowl is between seven and eight inches and its depth is a little over one inch, the ratio of depth to diameter being about one to six. This particular bowl is of the size adapted to accommodate food waste materials such as grapefruit rinds, paper cups and the like ordinarily encountered, but it is to be understood that the bowl may be made larger for use in grinders of larger capacity and likewise that it may be made smaller for grinders of smaller size.

The stationary cutting teeth 53 constituting the complementary grinding elements which are engaged by the material whirling within the grinding chamber 13, are formed on the inner surface of a shredding or cutting ring 61 that is removably mounted in an annular recess 62 machined in the housing 11 at the lower end of the feed stack 12. As appears in Fig. 1, the ring 61 is formed with its inner diameter equal to the inner diameter of the feed stack 12 in such a manner that its inner surface constitutes a downward extension of the lower end of the feed stack and forms the periphery of the grinding chamber 13. The outer surface of the annular ring 61 is provided with a circumferential groove 63 that presents a sloping upper face 64. For retaining the ring 61, set screws 65 are threaded through the side of the housing 11 to engage the sloping face 64 in a manner to wedge the ring 61 upward into secure seating engagement with the annular recess 62 in the housing. A dowel pin or the like may be interposed between the ring 61 and the housing 11 to prevent rotation of the ring within the recess 62, although this additional precaution is not essential. The same effect is attained by the alternative arrangement shown in Fig. 2 wherein the encircling groove 63 is replaced by a series of discontinuous notches 66 each presenting a sloping face 64 for receiving the inner ends of retaining set screws 65, the engagement of the screws with the notches serving to prevent rotation of the ring.

The ring 61 is preferably formed of a suitable long wearing material that lends itself to the formation of tough and abrasive resistant teeth 53, the ring being readily removable and replaceable in the event that long continued use should impair the cutting action of the teeth. As best shown in Figs. 1 and 2, the lower outer edge of the cutting ring 61 is crenelated or notched to form a series of radially disposed discharge slots 67 of proper size to admit passage through them of particles that have been ground to the desired degree of fineness. The radial slots 67 form in effect a particle screening or sizing arrangement that permits the discharging of material after it is ground to the proper size but before it is ground so fine as to form a sticky mass, while at the same time retaining within the grinding chamber 13 all particles of larger size for further grinding.

As best seen at the left in Fig. 1, the lower inner edge of the ring 61 is beveled or chamfered at an angle which in this instance is about 30 degrees with the horizontal to form a sloping surface 68 inclined upwardly and inwardly from the inner ends of the radial slots 67. Because of the cutback effected by this bevel or chamfer, the inner or entrance ends of the radial slots 67 are positioned slightly outward from the inner edge of the bowl rim 52. By this arrangement material rotating with and moving upward along the inner surface of the bowl rim 52 tends to continue its upward movement past the entrance ends of the slots 67 rather than to be forcibly driven into the slots. Furthermore, the inwardly inclined surface 68 tends to guide the material inwardly away from the entrance ends of the slots 67 thereby relieving pressure tending to force the material into the slot ends. Meanwhile the smaller ground particles are carried by the flushing water up and over the edge of the bowl rim 52 and outward into and through the radial discharge slots 67, the ends and bottoms of which present edges 69 that form supplemental cutting elements. The larger particles compacted on and whirling with the upper edge of the bowl rim 52 engage the lower cutting edges 54 of the stationary teeth 53 which operate upon them to effect the greater part of the disintegrating or grinding action. As these particles engage the cutting edges 54, their rotary motion is slowed and they lose the effect of the cohesive frictional force established by centrifugal action, whereupon they are deflected from the bowl rim and drop back into the bottom of the bowl 14.

Figure 6:
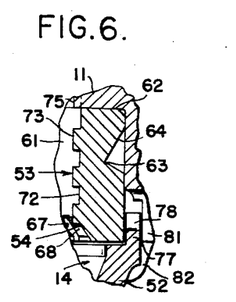
Figs. 6, 7 and 8 are enlarged fragmentary detailed sectional views of the internal cutting teeth in the cutting ring, taken respectively on the planes represented by the lines 6—6, 7—7 and 8—8 in Fig. 5.
Figure 7:
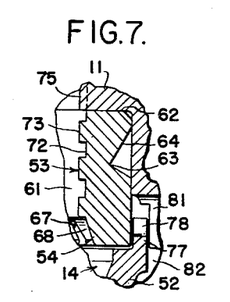

Larger objects such as a milk carton or the like that may stand in the center of the bowl 14 and rotate with it, turn and tumble within the grinding chamber 13 and the feed stack 12 thereby coming into engagement with the inner edges of the stationary cutting teeth 53. As best shown in Fig. 5, the shredding ring 61 is provided with three of the internal cutting teeth 53 preferably spaced equally about the inside of the grinding chamber 13. It has been found preferable to provide an odd number of the stationary teeth 53 in order that the teeth may be arranged so that they are not diametrically opposite each other. This improves the grinding action and obviates the possibility of a large object becoming caught on two diametrically opposed teeth at the opposite sides of the grinding chamber which might otherwise prevent further rotation of the object. The individual teeth 53 are in this instance formed about one-half inch wide and project about one-eighth inch radially into the grinding chamber 13. To provide for better engagement with large objects rotating in the grinding chamber, each tooth 53 is divided by circumferential grooves or notches 72 to form several vertically spaced individual cutting elements 73. As best shown in the enlarged sectional views, Figs. 6, 7 and 8, the individual cutting elements 73 of the three stationary teeth 53 are not arranged in circumferential alignment but are placed in staggered relationship in order that one or another of them may engage all surfaces of any large object rotating within the grinding chamber 13 thereby facilitating rapid reduction of the object to small particles that drop into the bottom of the bowl 14 for further grinding. Above the inner cutting elements 73 of the teeth 53 the inside of the feed stack 12 is provided with three integrally formed mulling projections 75 likewise about one-half inch wide and projecting one-eighth inch inwardly. These projections or vanes 75 occupy the lower two-thirds of the feed stack 12 and exercise a stirring or mulling action on material swirling within the feed stack causing the material to turn and tumble in a manner to move down into the bowl 14 and thereby reducing the danger of material jamming in the feed stack.

The bowl shaped rotor 14 is provided at the outer edge of its upturned rim 52 with a raised peripheral ridge or outer lip 77 that is best shown in the perspective view in Fig. 2. In the particular machine illustrated, the outer lip or rim 77 extends upward about one-eighth of an inch and runs in overlapping obstructing relationship with the lower part of the outer ends of the discharge slots 67 in the cutting ring 61. Accordingly, the particle size of the material being discharged from the grinder is determined by the remaining discharge opening presented between the top edge of the lip 77 and the tops of the partially covered ends of the slots 67. In order that elongated particles passing outward through the slots 67 may be cut into shorter pieces, the outer lip 77 of the bowl 14 is provided with a series of upwardly protruding secondary cutting teeth 78 angularly spaced thereabout and extending upward in overlapping relationship with the outer ends of the discharge slots 67, as best shown in Fig. 1. With the teeth 78 running in overlapping relationship with the discharge slots 67 any long particles extruded through the slots are sheared by the teeth in passing and thereby cut into short lengths suitable for discharge through the drain connection.

Figure 3:
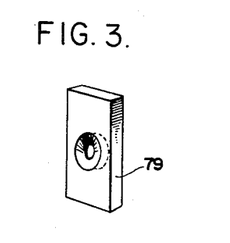
Fig. 3 is an enlarged detail view in perspective of one of the removable secondary cutting teeth of the type shown secured to the bowl in Fig. 2.
Figure 10:
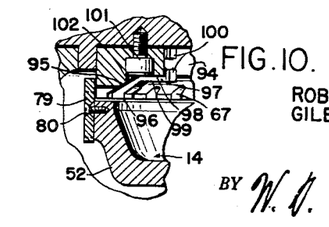

In the bowl structure 14 shown in Fig. 1 the secondary cutting teeth 78 are formed as integral protrusions upstanding from the outer lip of rim 77. As an alternative, the secondary cutting teeth may be in the form of separate reversible and replaceable cutting elements 79 each notched into and secured to the periphery of the bowl 14 by means of a retaining screw 80, as shown in Figs. 2 and 10 of the drawing. The separate or individual teeth 79 are preferably formed of a hard, tough material such as tool steel that is especially resistant to both the abrasive effects and the shock loads encountered in grinding operations. As appears in Fig. 3, each individual replaceable tooth 79 is formed symmetrically and is reversible in such a manner that it may be secured in any one of four positions relative to the periphery of the bowl 14 in a manner to present successively four different cutting edges as the several edges become dulled with use, the tooth being readily replaceable after the last edge has been dulled beyond further usefulness. In the same manner, other cutting teeth in the grinder may be provided with renewable portions, if desired, as more fully set forth in co-pending application Ser. No. 602,580, filed August 7, 1956, that constitutes a continuation in part of this specification. As another alternative, the removable secondary cutting teeth may be formed on a continuous band of material that is removably fitted on the periphery of the bowl 14 and that may be reversed thereon to present new cutting edges at the opposite ends of the teeth.

The number of secondary teeth required on the bowl edge depends upon the diameter and speed of rotation of the bowl and upon the degree of fineness required of the extruded material sheared by them. In the particular unit shown in Fig. 1, the bowl is provided with twelve integrally formed secondary teeth 78 while the bowl shown in Fig. 2 is equipped with four replaceable secondary teeth 79. It has been found that the shearing operation can be accomplished by means of only one or two secondary teeth but with more teeth a finer cutting action is insured.

The raised outer rim or lip 77 and upstanding secondary teeth 78 run in closely spaced relationship with the periphery of the cutting ring 61 and thereby form a labyrinth seal between the bowl and the ring for preventing the escape of uncut objects such as thin leafy or fibrous material that might otherwise move outward through the clearance space between the bowl and the cutting ring without being engaged by the cutting teeth. By the seal arrangement shown, such thin material encounters a narrow angular path in moving outward between the bowl and the cutting ring and is urged thereby into engagement with the cutting edges 69 formed at the sides of the discharge slots 67 and with the cutting edges of the teeth 78 whereby the material is disintegrated before being discharged. Any wear which may occur between the upper edge of the bowl 14 and the edges 69 of the discharge slots 67 does not interfere with the effectiveness of the seal since the upper ends of the teeth 78 do not wear away but continue to maintain close relationship with the periphery of the cutting ring 61. Furthermore, wear between the lower edge of the ring 61 and the upper surface of the bowl rim 52 may be compensated for by reducing the thickness of the shims 41 between the housing 11 and the motor end bell 38 whereby the bowl 14 may be adjusted upward into closer operating relationship with the ring 61. It has been found that the most effective sealing action results when the running clearance between the top of the bowl rim and the cutting ring is maintained less than twenty-five thousandths of an inch.

Figure 4:
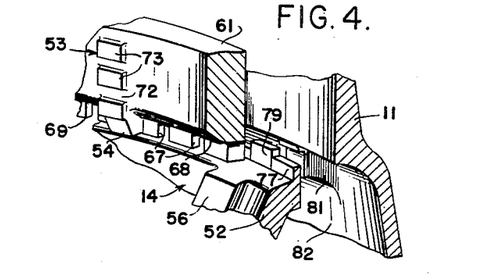
Fig. 4 is a fragmentary view in perspective of part of the grinding bowl and part of the cooperating housing sectioned to illustrate the interaction of the successive groups of cutting teeth.
Figure 8:
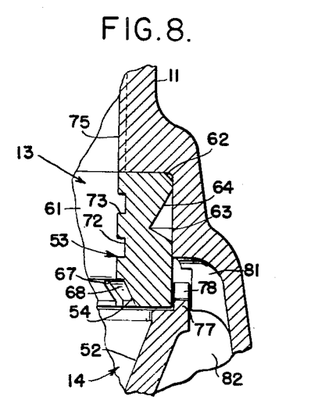

Any uncut material which may cling to the secondary teeth 78 or to the outer periphery of the bowl 14 is further sheared by a third set of teeth or clipper elements 81 that are fixed within and depend from the housing 11 outwardly of and in overlapping relationship with the teeth 78 on the periphery of the bowl. These clipper teeth are in the form of lugs about one-half inch wide formed integrally with the housing 11 as indicated in Figs. 1, 4 and 8 and it has been found that two of them are sufficient to effect removal of material clinging to the secondary teeth 78. The material clipped from the bowl by the teeth 81 together with the other ground material and the flushing water which flows outwardly through the slots 67 are thrown by centrifugal force from the bowl periphery into an annular discharge chamber 82 formed in the lower part of the housing 11 and encircling the bowl 14. The annular discharge chamber 82 is provided at one side with a discharge or outlet passageway 83 in the form of a down-turned elbow through which the ground material and flushing water flows into the drain connection. As shown in Fig. 1, the lower end of the discharge elbow 83 is connected by a resilient sleeve 84 of rubber or the like with a suitable drain pipe 85, in this instance about two inches in diameter. The ground material mixed with the flushing water flows from the grinder in the form of a slurry and passes through the drain pipe 85 into the usual drain system, the resilient sleeve 84 serving to reduce the transmission of vibration from the grinder to the pipe 85.

Figure 9:
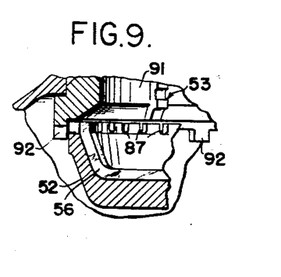
Fig. 9 is a fragmentary sectional view of parts of the housing and the cooperating bowl illustrating a modification of the invention in which some of the cutting elements are arranged in reverse position; and, Fig. 10 is another fragmentary view generally similar to Fig. 9 but showing another modification involving a different arrangement of the cutting ring.

As a modification of the interacting bowl rim and cutter ring arrangement, the secondary cutter teeth shown in Fig. 1 as mounted on the bowl rim and the cooperating discharge slots formed in the cutting ring may, if desired, be arranged in reversed position, as shown in Fig. 9 of the drawing. In accordance with this arrangement, radially disposed discharge slots 87 are formed in the upper edge of the bowl rim 52 and function in the manner of the radial discharge slots 67 that are formed in the cutting ring 61 in the structure shown in Figs. 1 and 2. The cooperating elements that complete the discharge labyrinth are in this instance carried by a modified cutting ring 91 and are in the form of secondary cutting teeth 92 which depend from the outer edge of the ring in overlapping relationship with the outer ends of the radial discharge slots 87 in the upper edge of the bowl rim. By this arrangement, a higher rate of discharge may be effected because of the direct action of centrifugal force in extruding the ground material through the slots 87 of the rotating bowl rim.

Another modification of the invention especially adapted for operating as apparatus having increased grinding capacity is shown in Fig. 10 of the drawing. In accordance with this modification, the bowl 14 is provided with the same removable peripheral secondary cutting teeth 79 that are shown in Fig. 2 although in the modified form the bowl may be somewhat larger. However, in this instance the cutting ring 61 of the grinder shown in Figs. 1 and 2 has been replaced by a modified cutting ring 94 that, while being removably mounted in the annular recess 62 in the housing 11, is of different shape and proportions. As shown, the modified ring 94 is flatter than the ring 61 although it presents at its lower outer edge the same crenelations or radially disposed discharge slots 67 of the previously described ring. In like manner the slots 67 terminate at their inner ends slightly outwardly of the inner wall of the bowl 14 in order that large particles of material moving upward from the bowl rim may pass by the inner ends of the slots without being forced into them. When this occurs the material comes in contact with an inwardly sloping face 95 that is interrupted by lower cutting edges 96 formed on fixed disintegrating teeth 97 and that function to effect the major part of the grinding operation. The face 95 is inclined at an angle of about 30 degrees in a manner similar to that of the face 68 on the ring 61 except that it does not continue to the inner edge of the ring but instead intersects a horizontal face 98 that forms a ledge extending inward to the lower inner edge of the ring 94. The horizontal face 98 interrupts the upward movement of material whirling with the bowl 14 and guides it into rotary disintegrating engagement with other depending horizontal cutting edges 99 on the teeth 97 extending downward about 3/16 of an inch below the horizontal face 98.

The stationary cutting teeth 97 are arranged in angularly spaced relationship about the ring 94 and are provided at their inner ends with inwardly projecting cutting elements 100 that correspond with the internal cutting elements 73 of the ring 61, although in this instance the ring 94 is preferably provided with a total of five stationary cutting elements 97 equally spaced about the ring. As in the case of the internal cutting elements 73 of the teeth 53, the inwardly projecting cutting teeth 100 are arranged in staggered relationship about the ring to provide for engaging all parts of an object rotating in the grinding chamber 13. Because of the relatively flat shape of the ring 94 it is convenient to secure it to the housing 11 by vertically disposed cap screws 101 preferably three in number projecting upward through countersunk holes 102 equally spaced about the ring 94 and threaded into the housing 11. By this modified arrangement of the stationary cutting teeth, a greater grinding capacity may be achieved. This in turn requires more driving power and therefore a larger motor with correspondingly sturdier construction throughout.

In the normal operation of the grinder, the driving motor 15 is energized through suitable electrical connections and controlling switches in the usual manner. Since the various cooperating cutting teeth on the bowl 14 and in the housing 11 are all symmetrical in form, the direction of rotation of the motor 15 and the rotor bowl 14 is immaterial, the motor in this instance operating at its normal speed of about 1725 revolutions per minute. Starting of the bowl is accomplished with low starting torque since any material remaining in the bowl from a previous operation or that has been placed in the grinder subsequently rests in the bottom of the bowl and out of contact with the stationary cutting teeth. An adequate stream of flushing water to facilitate the grinding operation and to flush away the ground material is introduced into the housing 11 through the tangential water inlet opening 28 from the usual connecting piping and control valves. The food waste material to be ground is then fed into the grinder through the opening in the rapping block 27 and, upon deflecting the resilient fingers of the seal 26, drops through the feed stack 12 and falls with the flushing water into the rotating bowl shaped runner 14. The material deposited in the bowl mixes with the flushing water and the wet mass is engaged by the radial vanes or ribs 56 and caused to spin or whirl with the bowl, the lower ends of long objects being engaged by the rotating ribs 56 and disintegrated to some extent thereby. Also any large object engaged by the rotating ribs, for example a paper milk carton, is caused to whirl and bounce about within the feed stack 12 and grinding chamber 13 thereby coming into violent contact with the internal cutting elements 73 of the teeth 53 on the inner surface of the cutting ring 61. This results in reducing the large objects to smaller pieces which fall into the bottom of the bowl with other small objects where they are engaged by the vanes 56 and are thereby whirled with the bowl. The centrifugal force resulting from the whirling or rotary motion of the wet material in the bottom of the bowl urges it outwardly along the flat central portion 51 toward the upturned rim 52. The whirling wet material then engages the inner surface of the rim 52 of the bowl and is compacted against it by operation of the component of the centrifugal force acting in the direction normal to the rim surface. The complementary component of centrifugal force which acts parallel with the sloping inner surface of the rim tends to urge the compacted material upwardly along the rim's inner surface toward its upper edge. The force component acting perpendicular to the surface operates to establish frictional cohesion between the various particles of material and between the mass of material and the surface of the rim whereby the material is caused to follow the rotary motion of the rim. However, as previously explained, the angle of inclination of the rim is so selected that the force component acting upwardly and parallel with the surface is sufficiently greater than the frictional resisting force established by the normal component to overcome it and insure the continued upward movement of the material along the inner surface of the rim. As the wet compacted material moves up the bowl rim it assumes the form of a rotating annular or ring shaped layer moving continuously upward past the upper edge of the bowl rim 52 and with its upper edge in whirling disintegrating engagement with the lower cutting edges 54 of the stationary cutting teeth 53 on the inner surface of the cutting ring 61. The frictional forces established by the centrifugal action serve to retain the material in a compacted body of annular or ring shape as the larger particles of the material continue upward past the inner ends of the radial discharge slots 67 and move inwardly along the sloping surface 68 at the bottom edge of the cutting ring 61. As the cutting edges 54 of the stationary cutting teeth 53 engage the upper edge of the rotating annular body and operate to disintegrate the individual pieces of material, the frictional forces retaining the particles in rotating engagement with the bowl rim are overcome and the particles become separated. As the material loses its whirling motion the accompanying centrifugal action ceases and the individual particles are deflected by the cutting teeth back into the interior of the grinding chamber where they fall to the bottom of the bowl 14 to be again whirled with the bowl and moved outwardly and upwardly along its inner surface. Likewise should the material whirling with the bowl engage the stationary cutting teeth 53 in such a manner as to slow the speed of rotation of the bowl, the centrifugal force and the cohesive force will be correspondingly reduced and the material will fall away from the teeth thereby avoiding jamming of the grinder.

The smaller particles moving upward along the rim to its upper edge are urged by centrifugal force outwardly over the top of the rim along with the flushing water and flow radially outward through the discharge slots 67. As previously explained, uncut material is discouraged from escaping by reason of the labyrinth seal between the bowl and the cutting ring. Long uncut pieces of material moving outward through the slots 67 are sheared into short lengths by operation of the secondary teeth 78 on the outer edge of the bowl rim. Likewise any material that clings to the secondary teeth and whirls with the bowl is engaged and clipped off by the stationary outer teeth 81 and falls therefrom with the other ground material and the flushing water into the annular chamber 82 for discharge through the passageway 83 into the drain pipe 85.

From the foregoing explanation of the improved grinder apparatus set forth herein by way of example, it will be apparent that the present invention has provided a new and highly efficient comminutor or disintegrator for use in the disposal of food waste and like materials. The marked improvement in grinding efficiency effected by this invention has been accomplished largely by virtue of the new grinding impeller in the form of a bowl shaped runner whereby materials to be ground are urged by centrifugal force outwardly and upwardly along the inner surface of the bowl into whirling engagement with stationary cutting teeth disposed in cooperating relationship with the bowl rim as hereinbefore described.

Although specific examples of improved disintegrating apparatus embodying the present invention have been set forth in detail for the purpose of effecting a complete disclosure of practical structures forming useful embodiments of the invention, it is to be understood that various other arrangements of the elements of the apparatus may be effected by persons familiar with this art without departing from the spirit and scope of the invention as defined in the subjoined claims.

The invention having now been fully described, what is claimed is:

1. In a rotary grinder for disintegrating food waste and like materials, a supporting frame structure, a bowl-shaped rotor carried by said frame structure for rotation about a vertical axis and presenting a sloping upturned rim so arranged that material fed into said bowl-shaped rotor for grinding is whirled thereby and urged under the influence of centrifugal force outwardly against and upwardly along the inner surface of said sloping upturned rim while rotating with it, a feed stack in said frame structure in position to feed material for grinding into said bowl-shaped rotor, power actuated driving apparatus operatively connected to rotate said bowl-shaped rotor in said frame structure, stationary cutting teeth elements carried by said supporting frame structure in cooperating relationship with said rotor and positioned to be engaged by the rotating material held against and moving upward along said sloping upturned rim, and a particle screening and sizing device arranged in cooperating relationship with the upper edge of said upturned bowl rim, the arrangement being such that the rotating material disintegrated by engagement with said cutting teeth is discharged by centrifugal action through said sizing device radially outward over the edge of said upturned bowl rim while particles of material resisting disintegration are prevented by said sizing device from being discharged and after engaging said stationary cutting teeth elements fall back into said bowl-shaped rotor for regrinding.

2. In a grinder having a stationary housing presenting a downwardly extending passageway terminating in an annular space for the discharge of ground material, an annular cutting ring mounted in said housing and depending into said annular space, the lower edge of said ring lying in a horizontal plane and having crenulations forming spaced cutting surfaces with radially extending openings therebetween for the discharge of ground material, said ring having longitudinally and circumferentially spaced cutting surfaces provided on its inner wall and an outwardly-flaring, bevelled surface adjacent to its lower edge with said spaced cutting surfaces depending from said bevelled surface and each having a horizontal lower edge, a rotary bowl arranged within said annular discharge space and having upwardly extending sides registering with said lower edge of said cutting ring, said bowl being rotatable about a vertical axis and the inner surface thereof having angularly spaced, upwardly extending ribs terminating at the upper edge thereof in cooperative underlying cutting relation to said bevelled surface of said ring and said cutting surfaces depending therefrom, the extreme outer periphery of said bowl having a raised surface extending above the lower horizontal edge of said ring and enclosing said edge to form a labyrinth passage therewith, circumferentially spaced protrusions mounted in said raised surface and overlying the outer sides of said crenulations to clip material passing therethrough, and angularly spaced elements mounted on the inner surface of said annular discharge space and arranged in radial cutting relation with the outer edges of said last mentioned protrusions on the periphery of said bowl.

3. In a grinder for food waste and like material, a housing defining a vertically disposed generally cylindrical feed stack constituting at its lower end a grinding chamber part presenting internal cutting teeth, the lower edge of said grinding chamber part being slotted to provide radially disposed discharge passages, and a cooperating runner of bowl shape mounted beneath said housing for rotation about a vertical axis concentric with said feed stack, said bowl-shaped runner having an upturned edge running in close association with said slotted lower edge of said grinding chamber part, and the lower ends of said cutting teeth, the inner surface of said upturned edge being of less diameter than the inner surface of said slotted lower edge of said grinding chamber part, whereby material fed through said feed stack into said rotating bowl-shaped runner is whirled thereby and urged by centrifugal force outwardly against and upwardly along said upturned edge into disintegrating engagement with said cutting teeth with the larger particles of material moving upward past the inner ends of said radial discharge passages and subsequently falling back into said runner while the smaller disintegrated particles move outwardly through said radial discharge passages and are discharged over the outer edge of said runner.

4. In a grinder for disintegrating food waste and like material, a generally cylindrical vertically disposed housing open at its upper end to constitute a material receiving feed stack that merges at its lower end into a grinding chamber presenting inwardly projecting disintegrating teeth, and a cooperating runner of bowl shape disposed to constitute a bottom closure for said grinding chamber and mounted for rotation upon the vertical axis of said housing, said bowl-shaped runner comprising a central disc-like element merging at its outer edge into an upturned outwardly sloping peripheral rim the inner surface of said rim being inclined outwardly at an obtuse angle of the order of one hundred ten degrees to the upper surface of said central disc-like element and said rim being disposed with its upper edge below said disintegrating teeth within said grinding chamber and registering with and running in close association with said cylindrical housing to constitute therebetween a restricted discharge opening, the arrangement being such that material for grinding fed through said feed stack onto said central disc-like element of said rotating runner is whirled thereby and urged under the influence of centrifugal force outwardly against and upwardly along the inclined inner surface of said sloping upturned peripheral rim into rotary grinding engagement with said inwardly projecting disintegrating teeth whereupon the partially integrated material falls back onto said runner and again moves outward and upward therein with the ground material discharging through said restricted opening between the upper edge of said runner rim and said housing while the material requiring further grinding moves upward past said restricted opening to engage again with said disintegrating teeth in said grinding chamber.

5. In a grinder for food waste and like material, a rotor bowl arranged for rotation about a vertical axis and having a sloping upturned rim, said bowl presenting internal material engaging lugs terminating adjacent the upper edge of said rim and presenting external upwardly extending lugs forming external cutting teeth extending above other parts of said rim, and a cooperating housing constituting a vertically disposed substantially cylindrical feed stack terminating at its lower end in a grinding chamber presenting internal cutting teeth and having radially disposed discharge slots along its lower edge, said housing being disposed above and in close concentric cooperating relationship with said rotating bowl, the arrangement being such that said internal cutting teeth of said housing coact with material in said grinding chamber whirling with said bowl while said external cutting teeth of said bowl rotate in overlapping cooperating relationship with the outer ends of said radial discharge slots in said housing, whereby material fed through said feed stack into said rotating bowl is urged by centrifugal force outwardly against and upwardly along the inner surface of said sloping upturned rim into rotary grinding engagement with said cutting teeth, the ground material being discharged through said radial slots with elongated particles thereof being further reduced by action of said external cutting teeth.

6. In a grinder for food waste and like material, a body of generally cylindrical shape constituting a vertically disposed feed stack leading into a grinding chamber, a removable cutting ring disposed concentrically of said body at the lower end of said feed stack in a position encircling said grinding chamber and presenting cutting teeth on its inner surface and on its lower surface, said lower surface being crenelated to present a series of radially disposed discharge slots, and a cooperating grinding bowl disposed beneath said cutting ring and mounted for rotation about a vertical axis concentric of said feed stack for receiving therethrough waste material for grinding, said bowl presenting a central disc-like rotor having an upturned rim with sides sloping upward at an angle of the order of 70 degrees to the horizontal and terminating closely adjacent to said cutting ring, whereby waste material to be ground may be fed through said feed stack into said rotating bowl to be whirled therewith and forced against and up said sloping sides thereof by centrifugal action into cutting engagement with said cutting teeth on the inner surface of said cutting ring, the ground material being then discharged outwardly over the upper edge of said bowl rim and through said discharge slots in said cutting ring.

7. In a grinder for food waste and like material, a housing defining a vertically disposed generally cylindrical feed stack constituting at its lower end a grinding chamber, the lower edge of said grinding chamber portion of said housing presenting slotted openings to provide radially disposed discharge passages and presenting internal cutting projections, and a cooperating runner of bowl shape mounted beneath said housing for rotation about a vertical axis concentric with said feed stack, said bowl-shaped runner having an upturned edge running in close association with said slotted lower edge of said grinding chamber and presenting outer cutting teeth projecting upward therefrom and disposed outwardly of said grinding chamber in position to run in overlapping cooperating relationship with the outer ends of said radial discharge passages, whereby material fed through said feed stack into said bowl-shaped runner is whirled thereby and urged by centrifugal force outwardly against and upwardly along said upturned edge into disintegrating engagement with said cutting projections, the disintegrated material being discharged outwardly through said radial discharge passages into shearing realtionship with said outer upwardly projecting teeth on said runner edge.

8. In a grinder for food waste and like material, a housing defining a vertically disposed feed stack constituting at its lower end a circular grinding chamber presenting internal cutting teeth and having an inclined deflecting surface extending downward and outward from the inner surface thereof, the lower edge of said grinding chamber part of said housing being slotted to provide radially disposed discharge passages and forming intervening radial cutting teeth, and a cooperating runner of bowl shape with an upturned edge mounted beneath said feed stack for rotation about a vertical axis concentric with said circular grinding chamber, said bowl-shaped runner having its upturned edge running in close association with said slotted lower edge of said grinding chamber part, the inner surface of said upturned edge being of less diameter than the inner surface of said slotted lower edge of said grinding chamber part, whereby material fed through said feed stack into said rotating bowl-shaped runner is whirled thereby and urged by centrifugal force outwardly against and upwardly along said upturned edge into disintegrating engagement with said cutting teeth with the larger particles of material moving upward past the inner ends of said radial discharge passages and inward along said inclined deflecting surface to subsequently fall back into said runner while the smaller disintegrated particles are discharged over the edge of said runner outwardly through said radial discharge passages.

9. In a grinder for food waste and like material, a runner of bowl shape adapted to rotate about a vertical axis, said runner comprising a disc-like element having an upturned peripheral rim extending upward a distance equal to about one sixth of its diameter at an angle of the order of 70 degrees to said disc-like element, a pair of material driving lugs extending radially in opposite directions from a position just outwardly of the center of said runner to said rim and then upwardly to the top of said rim each terminating there in an end face constituting a cutting tooth, and a plurality of secondary cutting teeth extending upwardly from the outer edge of said rim in angularly spaced relationship, and complementary cutting elements disposed in cooperating relationship with said cutting teeth at the top of said runner rim, the arrangement being such that said bowl rotates with its rim running in cooperating grinding relationship with said complementary cutting elements, whereby material deposited in said bowl will be whirled and thrown by centrifugal force in a manner to be urged outwardly against and upwardly along the inner surface of said upturned rim into grinding engagement with said cooperating cutting elements.

10. In a grinder for food waste and like material, a body of generally cylindrical shape constituting a vertically disposed feed stack leading into a grinding chamber, a removable cutting ring disposed concentrically of said body at the lower end of said feed stack in a position encircling said grinding chamber and presenting cutting teeth on its inner surface and on its lower surface said lower surface being slotted to present a series of radially disposed discharge slots, and a cooperating grinding bowl disposed beneath said cutting ring and mounted for rotation about a vertical axis concentric of said feed stack for receiving therethrough waste material for grinding, said bowl presenting a disc-like rotor having an upturned rim with sides sloping upward and terminating closely adjacent to said cutting ring, the angle of slope of said upturned rim being such that waste material fed through said feed stack into said rotating bowl and whirled therewith is held against and forced up said sloping sides thereof by centrifugal action into cutting engagement with said cutting teeth on said cutting ring and then discharged outwardly over the upper edge of said bowl rim and through said discharge slots in said cutting ring.

11. In a grinder having a stationary housing presenting a downwardly extending passageway defining a grinding chamber, said chamber terminating in a lower edge lying in a substantially horizontal plane and having cutting surfaces therein, a rotary bowl having upwardly extending sides registering with the outer portion of the lower edge of said grinding chamber, said bowl being rotatable about a vertical axis and arranged to propel material upwardly against the lower edge of said grinding chamber by centrifugal force to carry the material past said cutting surfaces, the extreme outer periphery of said bowl having a raised surface extending above the lower edge of said grinding chamber and enclosing the same to form a labyrinth passage therewith, angularly spaced protrusions mounted in said raised surface and overlying the outer ends of said cutting surfaces to clip material passing therethrough, and angularly spaced cutting elements mounted on the inner surface of said housing and arranged in radial cutting relationship with the outer edges of said angularly spaced protrusions on said bowl.

12. In a grinder for food waste and like materials, a housing forming a vertically disposed generally cylindrical feed stack merging at its lower end into a grinding chamber presenting inwardly projecting cutting teeth and presenting in its lower edge radially disposed discharge slots together with downwardly projecting outer cutting teeth spaced outwardly from the outer ends of said slots, and a rotary bowl impeller disposed below and operating in conjunction with said grinding chamber of said housing, said rotary bowl impeller having upwardly projecting peripheral teeth overlapping the outer ends of said discharge slots and disposed inwardly of said downwardly projecting outer teeth, whereby material fed through said feed stack is whirled in said bowl and thrown by centrifugal force outwardly and upwardly into grinding engagement with said inwardly projecting cutting teeth, the ground particles thereof being forced outwardly through said discharge slots into shearing relationship with said upwardly projecting bowl teeth operating in conjunction with said downwardly projecting outer cutting teeth.

13. In a grinder for food waste material and the like, a housing of substantially cylindrical shape disposed with its axis vertical to constitute a waste receiving stack and a grinding chamber presenting internal grinding projections, a grinder bowl mounted beneath said grinding chamber portion of said housing for rotation about a vertical axis concentric therewith and presenting an upturned edge moving closely beneath the lower edge of said grinding chamber portion, and cutting teeth secured to the outer upper edge of said bowl for rotating in cooperation with the exterior of said grinding chamber portion of said housing, the arrangement being such that waste material to be ground may be fed through said stack into said rotating bowl to be urged outwardly and upwardly by centrifugal force into whirling engagement with said internal grinding projections of said housing for grinding, the ground particles being discharged between the upper edge of said bowl and the lower end of said grinding chamber with long particles thereof being sheared and further ground by said outer cutter teeth.

14. In a grinder for food waste and like material of the type having a horizontally disposed grinding ring, a runner bowl arranged for rotation about a vertical axis and having an upturned rim presenting at its outer upper edge a plurality of spaced upwardly extending cutting teeth, said bowl being arranged to rotate with the upper surface of its rim closely adjacent to the lower edge of said grinding ring, and with said outer cutting teeth running in overlapping relationship with the outer surface of said ring, whereby material fed through said ring into the center of said rotating bowl and moving by centrifugal force outwardly and upwardly over said bowl rim and between its upper surface and the lower surface of said cooperating grinding ring is ground by cooperative action between said grinding ring and said overlapping cutting teeth.

15. A grinder for food waste and like material comprising a rotor of bowl shape arranged for rotation about a vertical axis and presenting a sloping upturned edge extending upward a distance equal to approximately one sixth its diameter, said upturned edge carrying internal driving lugs forming at their tops cutting elements and carrying external cutting teeth extending upward therefrom at its periphery, and a vertically disposed cylindrical housing constituting a grinding chamber arranged above said rotor in cooperative grinding relationship therewith, the arrangement being such that said rotor is rotated in cooperation with the lower end of said vertically disposed grinding chamber, whereby material fed through said grinding chamber into said bowl-shaped rotor is forced outward and upward by centrifugal force and over said upturned edge into grinding engagement with said external cutting teeth.

16. In a rotary grinder for disintegrating food waste and like materials, a supporting frame structure, a bowl-shaped rotor carried by said frame structure for rotation about a vertical axis, said rotor being in the form of a horizontally disposed disc-like element presenting a sloping upturned rim of height equal to one-sixth the diameter of said disc-like element and said upturned rim being inclined outwardly at an angle such that material dropped into said bowl-shaped rotor for grinding and whirled thereby is urged under the influence of centrifugal force outwardly against and upwardly along the inner surface of said sloping upturned rim while rotating with it in a compacted annular mass, power actuated driving apparatus operatively connected to rotate said bowl-shaped rotor in said frame structure, a material confining ring carried by said supporting frame structure and cooperating with said upturned rotor rim in a manner to provide therebetween a restricted discharge opening, and disintegrating cutting elements carried by said supporting frame structure in cooperating relationship with said rotor and positioned above said restricted discharge opening and inwardly of said rotor rim in a manner to be engaged by the rotating mass of material urged against and moving upward along said sloping upturned rim, the arrangement being such that the rotating mass of material is compacted by one component of the centrifugal force and moved by another component upward along the inner surface of said rim into operating engagement with said cutting elements for disintegration thereby, the disintegrated material then falling back into said bowl-shaped rotor for recirculation, whereupon the finely ground portion is then discharged by centrifugal action radially outward over the upper edge of said upturned rim and through said restricted discharge opening.

17. In a grinder for food waste and like material, a housing constituting a vertically disposed feed stack, a runner presenting an upturned rim rotating directly below said feed stack about a vertical axis concentric with said feed stack, the inner surface of said upturned rim being inclined outwardly at an angle of twenty degrees to said axis of rotation, and a concentric cutter ring removably mounted in said housing at the lower end of said feed stack in closely adjacent cooperating relationship with said upturned rim of said runner to constitute therewith a grinding chamber beneath said feed stack, said cutter ring being provided around its lower edge with radially disposed angularly spaced discharge slots positioned closely adjacent to the upper edge of said runner rim and presenting an overlying deflecting surface extending angularly inward and upward from said slots above the inner surface of said rim and then horizontally inward therefrom a sufficient distance and at the proper elevation to intercept material moving upward from said runner rim, said deflecting surface being interrupted by angularly spaced downwardly projecting and inwardly projecting cutting teeth, whereby material fed downward through said feed stack and said cutter ring into said runner is whirled thereby in said grinding chamber and moved by centrifugal force outwardly and upwardly along said upturned rim into grinding engagement with said inwardly projecting cutting teeth on said overlying deflecting surface, the ground particles being discharged over the edge of said upturned runner rim through said radial discharge slots in said cutter ring.

References Cited in the file of this patent

UNITED STATES PATENTS

| | | |
|---|---|---|
| 582,873 | Nilsson et al. | May 18, 1897 |
| 1,614,358 | Gandillon | Jan. 11, 1927 |
| 2,477,686 | Coss | Aug. 2, 1949 |
| 2,566,069 | Powers | Aug. 28, 1951 |
| 2,579,400 | Schindler | Dec. 18, 1951 |
| 2,592,215 | Wandel | Apr. 8, 1952 |
| 2,682,376 | Frank | June 29, 1954 |
| 2,760,730 | Jordan | Aug. 28, 1956 |
| 2,767,927 | Green | Oct. 23, 1956 |